United States Patent [19]

Ropte

[11] 3,949,785

[45] Apr. 13, 1976

[54] VALVE COMBINATION FOR FLAME PHOTOMETERS

[75] Inventor: Günther Ropte, Jena-Neulobeda, Germany

[73] Assignee: Jenoptik Jena G.m.b.H., Jena, Germany

[22] Filed: May 30, 1974

[21] Appl. No.: 471,400

[52] U.S. Cl. ............ 137/613; 137/614.19; 431/280
[51] Int. Cl.$^2$ ............................................. G05D 7/00
[58] Field of Search ....... 137/614.19, 614.2, 625.41, 137/613; 251/61, 61.2, 335 B; 239/411, 414; 431/DIG. 59, DIG. 48, DIG. 29, DIG. 28, DIG. 26, 280, 284

[56] References Cited
UNITED STATES PATENTS

| | | | |
|---|---|---|---|
| 1,830,067 | 11/1931 | Mellers et al. | 137/625.41 |
| 2,548,071 | 4/1951 | Saulsberry | 137/605 |
| 2,586,972 | 2/1952 | McKenzie | 431/DIG. 48 |

*Primary Examiner*—William R. Cline
*Assistant Examiner*—H. Jay Spiegel

[57] ABSTRACT

A valve combination for flame photometers particularly for a rapid and secure switching over from one to another fuel gas comprises a switching valve and a subsequent safety valve which either obstructs or lets pass a fuel gas emitted therefrom. Both valves are contained in a housing at a considerably short distance. Each of said valves has at least two entrance openings and one exit opening for the fuel gas.

The exit opening of the switching valve is at the same time the entrance opening of the safety valve, the latter opening being closely located relative to the exit opening of the safety valve.

1 Claim, 2 Drawing Figures

VALVE COMBINATION FOR FLAME PHOTOMETERS

BACKGROUND OF THE INVENTION

The invention concerns a valve combination for flame photometers comprising a switching valve and a subsequent safety valve connected thereto for either obstructing or letting pass the fuel gas emitted therefrom, wherein each valve has at least one entrance opening and one exit opening for the fuel gases.

Whenever a flame photometer is used for analysis of a test solution which is constituted by two or more elements, a double beam or multiple beam method has to be applied, in which one flame is surrounded by a plurality of optical systems including different filters, beam detectors and measuring instruments.

It is generally known that different sample elements require different maximum flame temperatures, which in turn demand different fuel gases, to provide appropriate conditions to excite the atoms of the sample elements.

Economies in test procedure, namely a least possible consumption of material and a reduction of time would result, if the fuel gas can be switched from one gas to another in a few seconds and without extinguishing the burner flame. In other words, a few seconds after the switching operation only the desired fuel gas is permitted to feed the burner of the flame photometer.

In the known flame photometer devices the switching over from one to another fuel gas lasts a few minutes including the steps of flowing supply and stoppage of the one fuel gas, and the activity of the other fuel gas. This is due to the arrangement and the form of the gas supply valves. Such valves generally comprise a switching valve and a safety valve which only supplies the gas if at the same time the required compressed air flows out.

BRIEF SUMMARY OF THE INVENTION

It is an object of the present invention to avoid the aforementioned drawbacks by providing a construction of a valve combination comprising a switching valve and a safety valve such that the volumes in and between the valves are considerably small and that any clearance volume is eliminated.

Accordingly, the invention a valve combination particularly for flame photometers comprising a switching valve and a safety valve, connected to the switching valve for closing and opening said switching valve, in which each valve has at least one inlet opening and one outlet opening for a fuel gas, characterised in that the safety valve and the switching valve are both arranged in a common housing, an outlet opening of the switching valve at the same time constitutes an inlet opening of the safety valve, an outlet opening of the safety valve is located adjacent to the inlet opening.

By virtue of this construction the otherwise disturbing and superfluous clearances are eliminated, sufficiently compact valve combination is provided and the number of gas duct inlets and outlets is considerably reduced.

In spite of the use of at least two fuel gases only one safety valve is required.

Advantageously, the extinguishing of the photometer flame is avoided in providing the switching valve with two inlets and a plug, displaceable between two stops, which in closing the one inlet, opens the other one.

An automatic connection between the switching valve and the safety valve is obtained by providing the safety valve with a stem, which, operated by a spring bellows, closes the outlet opening of the switching valve.

BRIEF DESCRIPTION OF THE DRAWINGS

In order that the invention may be more readily understood, reference is made to the accompanying drawings which illustrate diagrammatically and by way of example one embodiment thereof, and in which.

DETAILED DESCRIPTION

Figure 1:
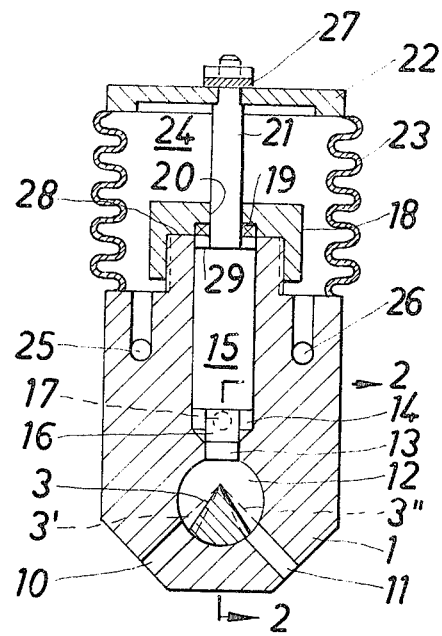
FIG. 1 is a longitudinal section through a valve combination.
Figure 2:
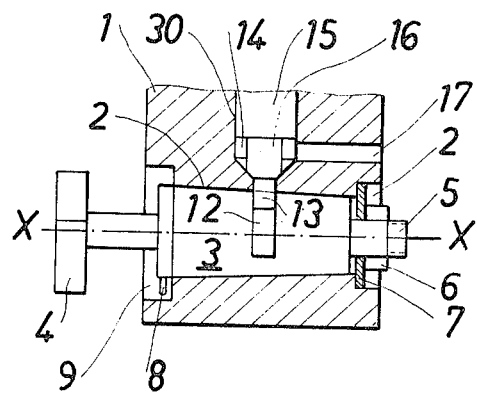
FIG. 2 is a section along the line 2—2 of FIG. 1.

A housing 1 comprises a valve cavity 2 adapted to receive a plug 3, which has a rotatable handle 4.

In order to secure the plug 3 against displacement parallel to its geometrical axis X—X, it is conically tapered and provided with a threaded portion 5, on which a nut 6 is screwed and, with a resilient washer 7, located between the housing 1 and the nut 6.

The valve cavity 2 and the plug 3 are components of the switching valve.

The plug 3 is provided with a pin 8 rotatable between two stops, integral with the housing 1, one of which, namely the stop 9, can be adjusted, and thus defines the angle of rotation of the plug 3 about the axis X—X.

Two inlets 10, 11 in the housing 1 are provided to introduce two different fuel gases, for example acetylene and propane, into the valve cavity 2.

A recess 12 in the plug 3 permits the inlet of only one of the two gases or of both of them, depending on the position of the plug 3 relative to the valve cavity 2. Said valve cavity has an outlet opening 13, into a further, substantially cylindrical valve cell 14 in the bottom-face thereof.

A plunger 15 with a plunger head 16 moves longitudinally in the valve cell 14, which is provided with an exit opening 17 in the wall 30 for the fuel gas.

The plunger head 16 is employed both as a closing means for the inlet 13 and outlet 17, and, in co-operation with the valve cell 14, as a component of a safety valve.

The end portion of the valve cell 14 opposite to the inlet 13 is closed by a cap 18 screwed to the housing 1. A stem 21 projects through an opening 20 in the cap 18 provided with a seal 19. Said stem 21 is rigidly connected at one end with a plunger 15 and is screwed to a closing plate 22 on its opposite end.

A seal 27 ensures an air tight screw connection between the closing plate 22 and the stem 21.

Resilient bellows 23 are connected in an air-tight manner at one end to the housing 1 and at the other end to the closing plate 22, thus forming a chamber 24 into which compressed air is fed through a duct 25, and from which the compressed air is vented by a duct 26.

By operation of the switching cocks (not shown for reason of simplicity) the selected fuel gas and compressed air are supplied or turned off. The fuel gases are respectively fed into the recess 12 through the inlets 11 and 10, and thence to the inlet opening 13, when the plug 3 is rotated into positions 3' or 3" defined by the stops. The fuel gas can only enter the valve cell 14, and from thence through the outlet opening 17 to the burner (not shown) if compressed air flows into the chamber 24 through the duct 25, expands the bellows against the inherent resilient force and lifts the plunger head 16 from the inlet opening 13, by a distance determined by the space between the face 28 of the plunger 15 and the face 29 of the cap 18.

By modifying plug 3 and the valve cavity 2 as well as by variation of the number and the arrangement of the recess in the plug 3 it is feasible to feed more than two fuel gases into the housing 1. This requires that the switching valve is provided with additional inlets.

I claim:

1. A valve combination for flame photometers comprising a housing, a switching valve and a safety valve, said switching valve and said safety valve being arranged in said housing, said switching valve having a valve cavity, at least a first and a second gas inlet opening and a first gas outlet opening, a plug rotatably arranged in said valve cavity and being rotatable into different positions and having at least one recess, said recess connecting one of said gas entrance openings with said first gas outlet opening, said safety valve including a cylindrical valve cell, a third gas inlet opening in flow communication with said first gas outlet opening, and a second gas outlet opening being joint and in operational connection with said third gas inlet opening, said third gas inlet opening being provided in the bottom face of said cylindrical valve cell, said second gas outlet opening being located in the wall of said cylindrical valve cell adjacent to said bottom face, a plunger being axially displaceable in said cylindrical valve cell, said plunger possessing a stem and a plunger head which is adapted to close and to open said third gas inlet opening, a closing plate, and a bellows being in airtight connection with said housing, on one end portion, and with said closing plate, on the opposite end portion, said stem projecting from said housing and being connected with said closing plate, said housing being provided with channels for air supplying and air emptying said bellows.

* * * * *